United States Patent

Constantin

[15] 3,704,826

[45] Dec. 5, 1972

[54] REAL TIME FAST FOURIER TRANSFORM PROCESSOR WITH SEQUENTIAL ACCESS MEMORY

[72] Inventor: Jean-Claude Constantin, Cagnes sur Mer, France

[73] Assignee: Thomson-CSF, Paris, France

[22] Filed: Dec. 24, 1970

[21] Appl. No.: 101,281

[30] Foreign Application Priority Data

Dec. 31, 1969 France ................................6945634

[52] U.S. Cl. ..................................................235/156

[51] Int. Cl. .............................G06f 7/38, G06f 15/34

[58] Field of Search ............235/156; 324/77 G, 77 H

[56] References Cited

UNITED STATES PATENTS

| | | | |
|---|---|---|---|
| 3,588,460 | 6/1971 | Smith | 235/156 |
| 3,544,775 | 12/1970 | Bergland | 235/151.31 |
| 3,573,446 | 4/1971 | Bergland | 235/156 |

*Primary Examiner*—Malcolm A. Morrison
*Assistant Examiner*—David H. Malzahn
*Attorney*—Flynn & Frishauf

[57] ABSTRACT

N complex samples of an input signal are stored in a sequential access circulating memory, and then transmitted to a calculator which has a pair of shift registers, each of N words capacity; the shift registers have terminals spaces by a single bit position from a final terminal, and an intermediate terminal, and are, alternatingly, stepped at shift rates of *f* and 2*f* respectively. An iterative method of fast Fourier transformation calculation is carried out by sequential access to the shift registers, alternatingly, and calculation of inputs (or outputs from) selected terminals of the shift registers, by means of selected interconnection from the specific shift registers to an adder, a subtraction circuit, and a multiplier which multiplies selected signals with a synthesized binary reference signal. The apparatus is useful for electrical signal spectral analysis.

11 Claims, 7 Drawing Figures

REAL TIME FAST FOURIER TRANSFORM PROCESSOR WITH SEQUENTIAL ACCESS MEMORY

The present invention relates to signal processing apparatus to obtain, in real time, the discrete Fourier transform coefficients. It is particularly useful to analyze the components of electrical signals within a spectrum of signals. The apparatus of the present invention provides a very advantageous utilization of the calculating process known as fast Fourier transform (FFT). This technique of calculation is highly efficient and uses an iterative process to calculate the N coefficients of the Discrete Fourier Transform (DFT) of a temporal sequence of N equidistant samples of a periodic time function.

If the time series function is not periodic, it is made such through assigning thereto a period which is large as compared with the interval of time during which this function has non-negligible values. The complex Fourier coefficients then calculated will provide a sampling of the Fourier transform itself. A theoretical discussion of this method of calculation is given in the article entitled :

"What is the Fast Fourier Transform," pages 45 to 55, "IEEE Transactions on Audio and Electroacoustics, Vol. AU-15, No. 2, *June* 1967."

Various apparatus have been proposed to effect the calculation of fast Fourier transform from a sampled signal, and reference is made to the article :

G.D. Bergland : "Fast Fourier Transform Hardware Implementations — An Overview,"pages 104 to 108, "IEEE Transactions on Audio and Electroacoustics, Vol. AU-17, No. 2, June 1969."

The apparatus proposed in accordance with the technique utilizes mostly memory units which are of the random access type. Such memories are bulky and expensive, and require fairly complex addressing systems.

It is an object of the present invention to provide a calculating system and apparatus using sequential access memories to calculate by the fast Fourier transform technique the discrete Fourier transform coefficients.

Subject matter of the present invention :

Briefly, iterative calculation sequences are obtained by sampling the input signal, and transforming the signals into $N=2^n$ complex signal samples and applying these complex signal samples to a circulating memory have sequential access. A calculator which includes a pair of sequential access memory elements is then provided to effect successive iterative calculations of the coefficients. In accordance with the preferred form of the invention, the sequential access memory elements are shift registers which, alternatingly, shift at rates $2f$ and $f$ respectively. They are connected to arithmetic calculating elements including an adding, subtraction, and multiplying circuit. Switch-over elements, such as commutator-type switches are used to appropriate connecting different elements of calculator and namely to control alternating application of signals to the shift register having the faster shifting rate. The signal samples are first applied to the shift register having the faster rate, and successive iterations are then applied, alternatingly, to the shift register having the faster rate. Depending upon the specific connection of the shift registers, the output will be either in direct binary order, or in binary order inverse with respect to the natural order of the N Fourier coefficients.

The invention will be described by way of example with reference to the accompanying drawings, wherein.

Figure 1:
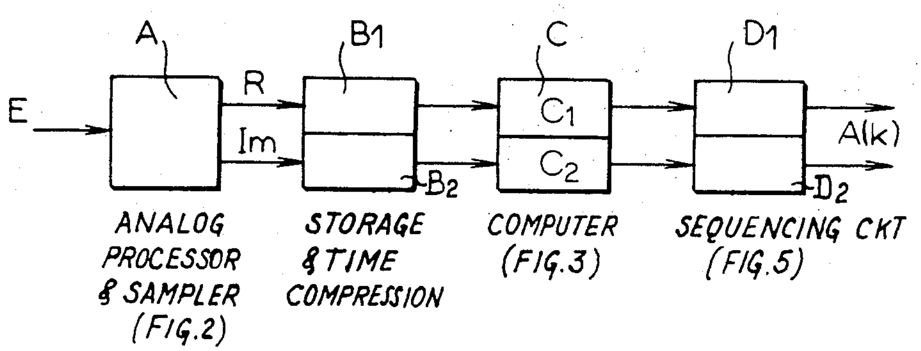
FIG. 1 is an overall block diagram of the apparatus in accordance with the invention.

Spectral analysis of signals in real time can be obtained, in general, by the apparatus of FIG. 1. The signal E is applied to an analog unit A , shown in detail in FIG. 2. This unit may be termed an analog processor and sampler. It transforms, in known manner, the signal E into two temporal sequences of $N$ quantified samples, each corresponding to the real portion R and the imaginary portion I$m$ , respectively, of a complex signal. This permits simplification of the filtering with respect to the selection of a band F of frequencies.

Figure 2:
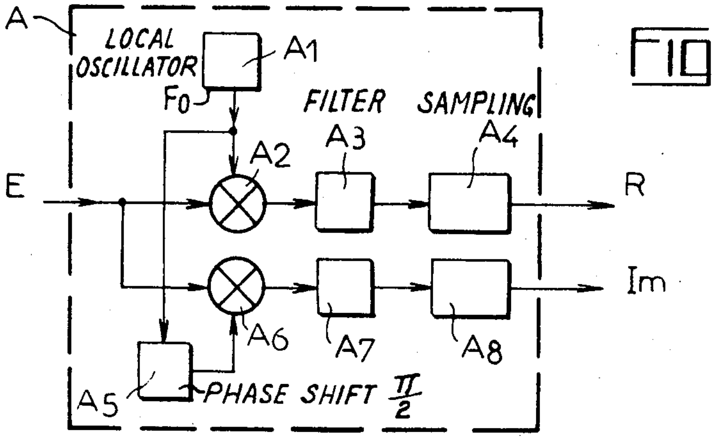
FIG. 2 is a schematic diagram of the analog modulator and phase shifter forming the input portion of the circuit.

As seen in FIG. 2 , the input signal E is applied simultaneously to a pair of multipliers $A_2$ and $A_6$. Multipliers $A_2$ and $A_6$ additionally receive a signal derived from a local oscillator $A_1$ of frequency $F_0$ . This same signal is applied to a phase shifter $A_5$ shifting the phase by $\pi/2$ . Within the band of frequencies $-(F/2)$ to $+(F/2)$ , two signals are derived having spectral components in phase quadrature. These signals are filtered, $A_3$ and $A_7$ and sampled and quantified by sampling and quantifying circuits $A_4$ and $A_8$ . The outputs from the circuits $A_4$ and $A_8$ will be two temporal sequences R and $I_m$ , each formed of N quantified samples of the input signals E . $N$ is, selected to be $2^n$. Each one of the temporal sequences is stored in a time compression memory, $B_1$ and $B_2$ respectively, before being transmitted to a computer C. The computer receives, thus, a sequence of $N = 2^n$ of finite complex numbers S ($j$), in which $j$ is a whole number between zero and $N - 1$ . It is known that the discrete Fourier transforms of such a series is defined by the mathematical expression:

$$A(k)=\frac{1}{N}\sum_{j=0}^{N-1} S(j)\,W^{jk} \qquad (1)$$

wherein : $W=e-2i\pi/N$ ; and $i=\sqrt{-1}$ .

It is also known that the discrete Fourier transform (DFT), and the inverse discrete Fourier transform (IDFT) are defined by mathematical relationships of very similar form. Thus, an algorithm which calculates the direct Fourier transform can thus also be used to calculate the inverse, simply by changing the roles of The dehumidifier film or coat is strongly bonded to the material of a container being dehydrated, so that no additional means or operations are required for securing said dehumidifier composition in said container.

The method of obtaining the present dehumidifying composition in the form of a film or coat comprises applying onto the inner surface of containers a suspension containing 100 parts by weight of zeolite having a humidity of 20–23 wt. percent, 45–280 parts by weight of a thermosetting resin, 120 parts by weight of an organic solvent intended for dissolving said resin, 0–45 parts by weight of a suitable plasticizer, and 0–85 parts by weight of a curing agent.

The suspension applied onto the inner surface of a container is maintained in the air at a temperature of from 5° to 80° C in order to remove the bulk of volatile components, followed by subjecting said suspension to heat treatment in vacuo at a residual pressure of not greater than $10^{-1}$ mm Hg and at a temperature of from 150° to 180° C. Said heat treatment removes the last traces of volatile components, brings about binder polymerization and results in the formation of film or coat (layer) depending upon the amount of the suspension used, said film (coat) being characterized by a highly extended porous structure which is adhesively bonded to the coated surface and provides for the requisite kinetics of water vapor adsorption. The porous structure of a dehumidifying composition film is defined by the volume of primary pores in zeolite crystals and by the volume of secondary pores. The volume of secondary pores depends primarily on the dispersity of zeolite crystals and binder (resin) particles, as well as on the nature of the binder used, and the type and density of zeolite crystal and binder particle packing.

The volume of secondary pores in the range of equivalent radii of from 291,000 to 31 A equals 0.044 $cm^3/cm^3$, a significant portion of said volume (0.020 $cm^3/cm^3$) being due to the pores in the equivalent radius range of from 98 to 31 Å.

An essential feature of the present dehumidifying composition is that it provides the possibility of controlling the kinetics of adsorption by varying the proportion of components of stock suspensions, so that the present dehumidifying composition can be used in devices and instruments of various types and sizes, the desired kinetics of moisture adsorption inside a given device (instrument being attained by selecting an appropriate ratio of suspension components. As compared to the known dehumidifying agents in the form of tablets or thickened silicone oil-based mixtures, the present dehumidifying composition in the form of a film or coat occupies a very small volume inside casings and has an insignificant weight. Said beneficial characteristics of the present dehumidifying composition make it eminently suited for use in conjunction with microminiaturized electronic instruments. The dehumidifying composition contained in an instrument casing (bulb) can be repeatedly regenerated, thereby making it practicable to have a requisite stock of dehumidifier-coated casings, a further advantage of the present dehumidifier being the absence of oil on the surfaces to be welded and, hence, the ease of sealing hermetically the devices or instruments.

The present dehumidifying composition is employed without resorting to mechanical means for securing said composition in instrument (device) casings or to special-type equipment for introducing said composition into instrument (device) casings and is suitable for being introduced into casings (bulbs) of any shape or size at one and the same production section, the latter feature being highly advantageous for the simultaneous production of diverse types of semiconductor instruments. It is expedient to use the present dehumidifying composition irrespective of the scale or automation degree of production processes or when the manufacture of instrument casings and the assembly of finished semiconductor devices are carried out at different plants.

It follows from the foregoing that the present dehumidifying composition used in the form of a film or coat is commercially superior to the known dehumidifiers.

The following examples are illustrative of the manner of carrying out the invention but are not intended to limit the scope thereof.

EXAMPLE 1.

One hundred parts by weight of Type Na zeolite A (moisture content, 25 percent by weight; particle diameter, 4 mc maximum) is mixed with 100 parts by weight of epoxide resin (molecular weight, 370–450; epoxy group content, 18 percent) dissolved in 127 parts by weight of an organic solvent having the following composition, percent by weight: butyl acetate, 10; cellosolve ($C_2H_5$—$OCH_2CH_2OH$), 8; acetone, 7; butanol, 15; ethanol, 10, and toluene, 50. Dubutyl phthalate (plasticizer) is added to the stirred mixture in an amount of 5 parts by weight, followed by introducing 10 parts by weight of polyethylene polyamine (curing agent). The resulting mixture is thoroughly mixed to obtain a homogeneous suspension. The dehumidifying composition thus prepared is ready for use.

Use is made of a buret, an atomizer or a syringe to apply the composition on the inner surface of instrument metal casings (bulbs) having a volume of 0.25 $cm^3$. From 10 to 12 mg of said composition is introduced in each bulb, followed by maintaining the bulbs with said composition applied thereonto for a period of 10–20 hours in the air at ambient temperature in order to remove the bulk of volatile components. Next the bulbs are placed in a vacuum drying cabinet, subjected to gradual heating to a temperature of 180° C at a residual pressure of 0.1 mm Hg, and maintained at this temperature for a period of 3 hours. It is pertinent to gradually heat the composition in order to provide in the resultant film an access of zeolite micropores to the ambient atmosphere and to attain good adhesion of the film to the bulb surface. The resultant film displays heat stability up to a temperature of 200°C in the air. The thus-treated bulbs are ready for use as sealing components of instruments or circuits.

Mechanical tests of the film under the conditions prescribed for testing transistors enclosed in bulbs are indicative of the absence of crumbling, dusting or cracking phenomena.

The film obtained by the procedure described herein before is capable of maintaining in the hermetically sealed volume of the bulb a low relative humidity in the temperature range of from −60° to +150°C.

tation and then will pass rapidly and alternatingly from the position $g$ to the position $h$, at the frequency of calculation $2f$ during the last iteration of the calculating cycle, and thus supplying the real part $A_1(k)$ of the Fourier coefficients $A(k)$ to unit $D_1$ and while commutator 480 of the imaginary section supplies unit $D_2$ with the imaginary part $A_2(k)$ of these Fourier coefficients. During this last iteration, commutator 41 changes back to position $c$ in order to supply as soon as possible a new part of the signal to be computed in the computer unit C.

Figure 4:
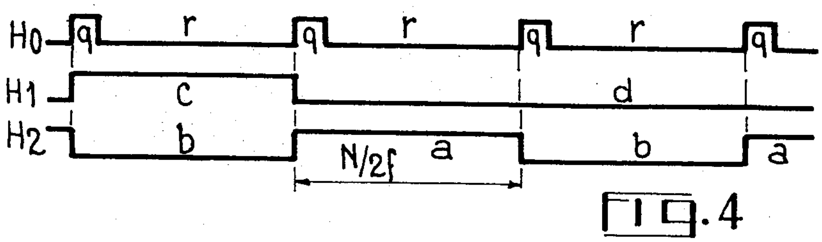
FIG. 4 is a timing diagram illustrating time sequences of signals arising in the apparatus of FIG. 3.
Figure 7:
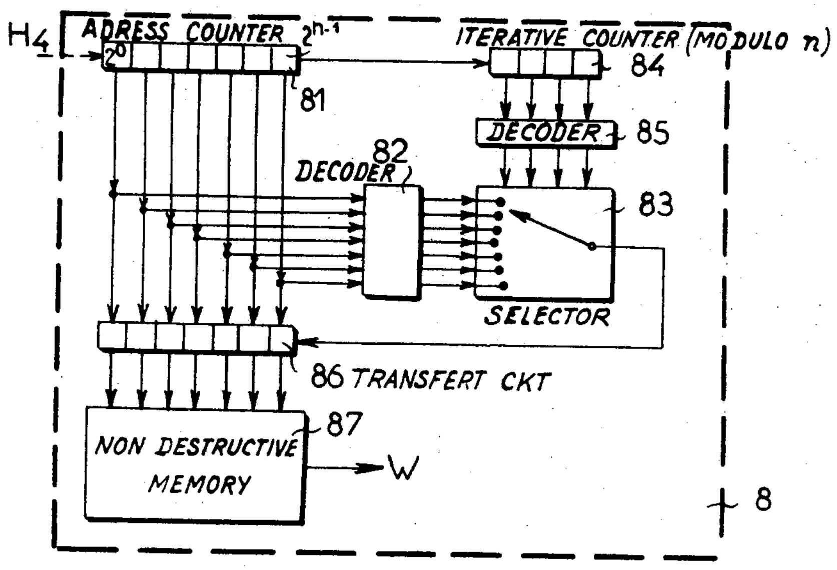
FIG. 7 is a schematic diagram of a synthesizing circuit used in the apparatus of FIGS. 3 and 6.

Timing diagrams of clock signals $H_0$, $H_1$ and $H_2$ are shown in FIG. 4. The clock signal $H_0$ has a period equal to $N/2f$, corresponding to the circulation of the sample in memory 3. The duration during which the signal $H_0$ places the commutator 2 in the position $q$ is equal to $1/2f$, that is, the duration of one shift in memory 3. The clock signal $H_1$ has a rate of $nN/2f$ and duration during which it places the commutator 41 in the position $c$ is equal to $N/2f$. Clock signaL $H_2$ has a rate which may, for example, be $N/f$; it thus places the commutators which it controls alternatively in the positions $a$ and $b$ during periods equal to $N/2f$.

If, during transfer of samples $S(j)$ of the memory 3 to the computer section $C_1$, commutator 41 is in the position $c$, commutator 42 is, for example, in the position $b$, then the samples are stored in register 51. At the end of this transfer, commutator 41 changes to the position $d$ and remains there during $n-1$ iterations only, since during $n^{th}$ iteration, by switching to the position $c$, this commutator gives the possibility to introduce for processing $N$ new words in one of the cleared registers 51 or 52, the other one of which being then connected to unit $D_1$ by means of the commutator 48. During the first iteration, all commutators controlled by the clock signal $H_2$ are placed in the position $a$, and the frequency of shifting of register 51 is thus equal to $f$ whereas that of register 52 will be equal to $2f$. The samples $Y$ taken from the mid-length terminal $N/2$ of the middle of the register 51 are on one part added, and on the other subtracted from the samples $X$ derived from that register. The results X-Y of the subtraction are then multiplied in the multiplier element 7 with the values of the first sequence W furnished by the unit 8 (described in more detail below). The results $V$ of these products are applied to the first stage of the shift register 52. Simultaneously, the results $U = X + Y$ furnished by the adder 61 are applied to the second stage of the register 52. At the end of this iteration, register 52 will thus contain $N$ words such as $V$ and $U$, whereas the register 51 will be empty. The commutators, controlled by clock signal $H_2$ will pass then to the position $b$ and calculation, during the next iteration step will be effected as previously described and in the same manner with the words contained in the register 52. At the end of the cycle of $n$ iterations, it can be shown that thus $N$ coefficients $A(k)$ are obtained, these coefficients appearing in the inverse binary order with respect to their natural order.

Figure 5:
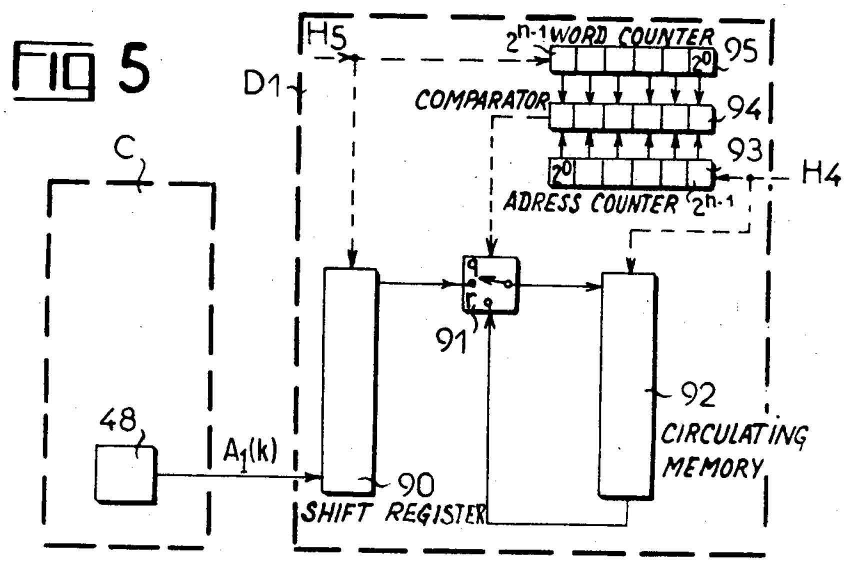
FIG. 5 is a schematic block diagram of apparatus to re-position, or re-arrange the information output derived from the apparatus of FIG. 3.

If it is desired to re-establish the natural order of the $N$ Fourier coefficient $A(k)$ then the unit $D_1$ (FIG. 5) is used. The $N$ coefficients $A(k)$ supplied by the commutator 48 of calculator C are stored in a shift register 90 having its output connected to the $q$ terminal of a commutator 91, controlled by a signal obtained from a comparator 94. The output of commutator 91 is connected to the input of a circulating memory 92, having its output connected to the $r$ terminal of the commutator 91. Comparator 94, controlling the switching of the commutator 91 receives binary values derived from two counters 93, 95, each having a capacity equal to $n$. The comparator searches for identity of the binary number of rank $i$ delivered by the counter 93 with the binary number of rank $n-1-i$ delivered by the counter 95. This comparison is done for all values of $i$. Counter 93, which may be termed the address counter, is controlled by the same clock signal $H_4$ which controls the shift of information in the circulating memory 92. The counter 95, which may be termed a word counter is controlled by a clock signal $H_5$ which controls the shifting of information in register 90.

Each time that binary information is applied to the comparator 94 by counters 93 and 95, and the comparator determines an identity, commutator 91 is controlled to switch to the position $q$ and the word issuing at that moment from register 90 is ordered in the circulating memory 92. Conversely, the commutator 91 is in the position connected to terminal $r$ and the information from the memory 92 is re-inserted at the input of the memory 92 itself. Thus, the natural order of the coefficients $A(k)$ is re-established.

Figure 3:
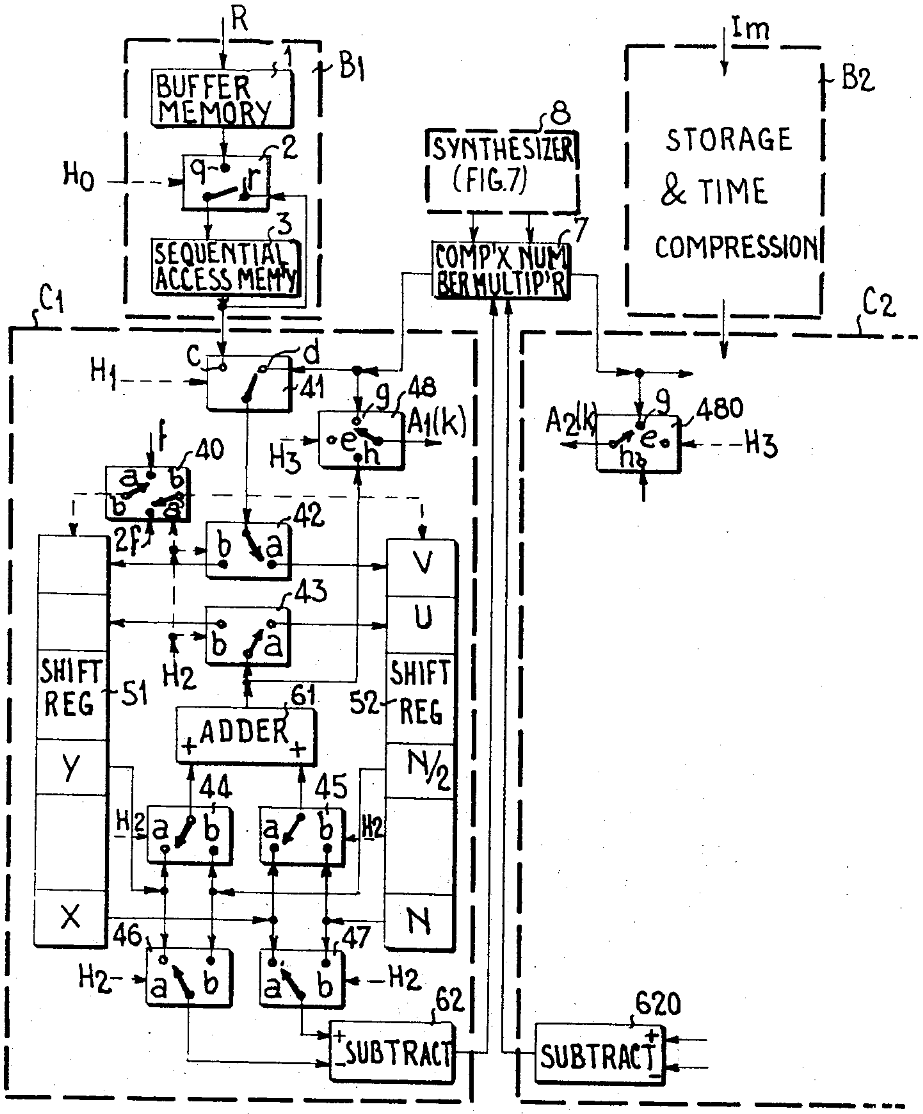
FIG. 3 is a schematic block diagram of one embodiment of computation sections of the apparatus in accordance with the invention.
Figure 6:
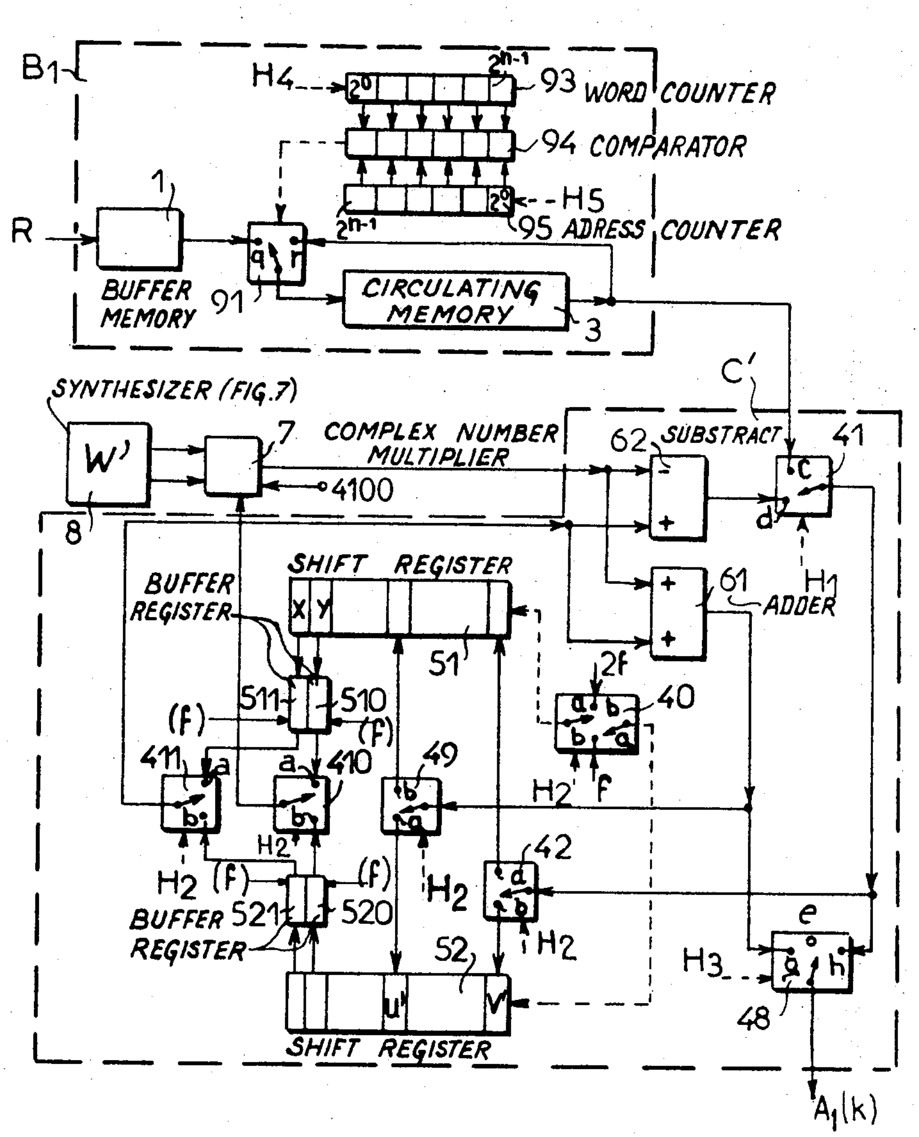
FIG. 6 is a schematic block diagram of a second embodiment of one computation section of the present invention.

Embodiment of FIG. 6 as FIG. 3 illustrates, for convenience, only the real part section arrangement: The sampled signals, that is the $N=2^n$ complex samples $S(j)$ of the input signal E are applied to a calculating unit section $C'$ in inverse binary order from their order of arrival, and the $N$ complex coefficients $A(k)$ of the Fourier transform will then appear at the output of the computer unit $C'$ in their natural order since it is known that a calculating unit provides coefficients in bit-reversed order as compared to the bit order of input application. It can be shown that this natural order is obtained by re-arranging the samples in the circulating memory 3' in accordance with a technique similar to that utilized to re-arrange the output from calculator C and described in connection with FIG. 5. The computer unit $C'$ utilizes, again, an iterative technique. The computation consists, upon each iteration, in taking two samples $X$ and $Y$ having contiguous addresses in order to calculate two new words $U' = X + W'Y$ and $V' = X - W'Y$. The two words $U'$ and $V'$ are located at addresses spaced from each other by $N/2$ addresses.

The input sampling apparatus includes a buffer memory 1. From the buffer memory, the samples are arranged in the circulating memory 3' in inverse binary order with respect to their order of arrival. Commutator 91 is interposed between the buffer 1 and memory 3', and controlled by a signal supplied by a comparator 94 completely similar to that described in connection with FIG. 5. The comparator 94, again, is controlled by a clock signal $H_4$ which also controls the address counter 93, at the frequency 2f of circulation of the samples in the memory 3'; the clock signal $H_5$ is applied to the word counter 95 and corresponds to the frequency of arrival of the samples, that is, to the frequency of sampling of the input signal E.

Information leaving the circulating memory 3' is received by the computer unit section $C'$ at the input switch-over circuit, or commutator 41. Commutator 41 is controlled, again, by clock $H_1$. The output from and exhibits the requisite kinetics of water vapor adsorption.

7. An enclosure for providing a moisture-free environment comprising a container for said environment, having at least some portion of its inner surface coated with a film of the desiccant composition of claim 1.

8. A hemetically sealable container for providing a moisture free environment for enclosing moisture sensitive equipment having at least some portion of its inner surface coated with a film of the dehumidifying composition of claim 1.

* * * * * ing memories operating at 2 MHz, $N$ coefficients of the Fourier series within the frequency band of 0–100 kHz can be computed in a calculation time in the order of 5 m/sec. The apparatus can, advantageously, use shift registers made of MOS type semi-conductor units. Its primary use may be for spectral analysis of electrical signals, for calculation of integrals of convolutions and for correlation of electrical signals.

In FIG. 6, a terminal 4100 is connected to multiplier 7; this terminal 4100 corresponds to terminal 620 of FIG. 3 to enter output from a commutator similar to commutator 410 of a unit C′ calculating the imaginary components of the coefficients.

What is claimed, is:

1. A real-time Fast Fourier tranform processor with sequential access memory wherein the discrete Fourier transform coefficients of electrical signals are calculated by iterative processing known as Fast Fourier Transform, (FFT), said processor comprising:
   sampling means A converting analog input signals (E) applied thereto into $N = 2^n$ complex signal samples and producing two temporal sequences relative to the real R and the imaginary I parts, respectively, of said complex signal samples,
   a calculating means C receiving said sequences and comprising two computation sections $C_1$, $C_2$ for processing respectively, one, the said real part and, the other, said imaginary part, each section including a pair of sequential access data shifting memory elements 51, 52,
   a synthetizer means 8 generating complex binary reference numbers,
   a complex number multiplier means 7 connected at the output of each said sections and to the output of said synthetizer,
   a plurality of controlled switching means 40–48 to selectively switch over the circuit elements, including said memory elements 51, 52 in accordance with each successive iterative processing step,
   and wherein
   the pair of memory elements of one of said computation sections has N words capacity each, the shift frequency $2f$ rate of one said memory element being twice that of the other $f$ during one iterative cycle of processing and the shift frequency rate $f$ of said one memory element being one-half that of the other $2f$ during the next iterative cycle, and each. said computation sections $C_1$, $C_2$ providing at the end of n iterations output signals corresponding to the real $A_1(k)$ and the imaginary $A_2(k$ parts respectively of the $N$ looked for Fourier coefficients.

2. Apparatus according to claim 1, wherein said pair of sequential access memory elements 51, 52 is formed by two/shift registers of $N$ words capacity, the $N$ stages of each said shift registers having
   a first input at the first stage position,
   a middle-length input at the $N/2$ stage position,
   a first output at the $N$-1 stage position and
   a second output at the $N$ stage position;
   and said calculating means further comprises shift control means effecting shifting of the contents of said registeres at different rates, the shift frequency of one of said registers (for example, $51 = 2f$) being twice that of the other (then: $52 = f$) and including first switch-over means 40 alternatingly, for successive iterations $H_2$, connecting said shift registers to be shifted at the higher rate, and the lower rate, respectively;
   connection means $B_1$; 41 connecting and applying $N$ samples in binary order inverse with respect to their natural order to the shift register 51 having the higher shifting (2f) rate;
   the synthesizer means forming a signal generator 8 generating a binary reference number signal;
   the complex number multiplier means 7 having the signal from the first output of the N-1 stage position Y and said reference number signal W applied thereto;
   an adder circuit 61 connected to receive during one iterative cycle the group of bits from the second $N$ output of one of said shift register and to receive continuously the output from said multiplier to add said multiplier output and said second output from the $N$ stage position;
   a subtraction circuit 62 connected to receive during an iterative cycle the group of bits from said second output $N$ of one said shift register and to receive continuously the output from said multiplier to subtract said multiplier output from said group of bits from the shift register second output $N$;
   said controlled switching means comprising
   means interconnecting the output of said adder 61 to the middle length $N/2$ input of the other register 52;
   means interconnecting the output of said subtraction circuit 62 to the first input of the other register 52;
   commutator means 42, 49, 410, 411 switching in synchronism $H_2$ with said first switch-over means 40 and interchanging the relative connections of said multiplier, adder and subtraction circuits with said registers;
   and clock means $H_2$ controlling the sequence of switching of said switch-over means,
   the last sample filled register, at the termination of $n$ successive iterations and upon $n$ operations of said switch-over means, containing the $N$ Fourier coefficients $A(k)$ arranged in their natural order.

3. A processor according to claim 1 wherein connection means between said sampling means and one said calculating means comprise a circulating sequential access memory means for storage and time compression of said complex signal samples.

4. Apparatus according to claim 1, wherein said sequential access memory elements 51, 52 comprise
   a pair of shift registers of N stage capacities, each register having
   first and second terminals at one end, a third terminal at the other end, and a half-length terminal at the $N/2$ stage position;
   and said calculating means further comprises shift control means affecting shifting of the contents of said registers, at different rates, related by a factor of two whereby the shift frequency $2f$ of one of said registers, e.g., 51 is twice that of the other 52, said shift control means including first switch-over means 40 alternately, for successive iterations $H_2$ connecting said shift registers to be shifted at the higher, or lower rate, respectively;

The dehumidifier film or coat is strongly bonded to the material of a container being dehydrated, so that no additional means or operations are required for securing said dehumidifier composition in said container.

The method of obtaining the present dehumidifying composition in the form of a film or coat comprises applying onto the inner surface of containers a suspension containing 100 parts by weight of zeolite having a humidity of 20–23 wt. percent, 45–280 parts by weight of a thermosetting resin, 120 parts by weight of an organic solvent intended for dissolving said resin, 0–45 parts by weight of a suitable plasticizer, and 0–85 parts by weight of a curing agent.

The suspension applied onto the inner surface of a container is maintained in the air at a temperature of from 5° to 80° C in order to remove the bulk of volatile components, followed by subjecting said suspension to heat treatment in vacuo at a residual pressure of not greater than $10^{-1}$ mm Hg and at a temperature of from 150° to 180° C. Said heat treatment removes the last traces of volatile components, brings about binder polymerization and results in the formation of film or coat (layer) depending upon the amount of the suspension used, said film (coat) being characterized by a highly extended porous structure which is adhesively bonded to the coated surface and provides for the requisite kinetics of water vapor adsorption. The porous structure of a dehumidifying composition film is defined by the volume of primary pores in zeolite crystals and by the volume of secondary pores. The volume of secondary pores depends primarily on the dispersity of zeolite crystals and binder (resin) particles, as well as on the nature of the binder used, and the type and density of zeolite crystal and binder particle packing.

The volume of secondary pores in the range of equivalent radii of from 291,000 to 31 A equals 0.044 $cm^3/cm^3$, a significant portion of said volume (0.020 $cm^3/cm^3$) being due to the pores in the equivalent radius range of from 98 to 31 Å.

An essential feature of the present dehumidifying composition is that it provides the possibility of controlling the kinetics of adsorption by varying the proportion of components of stock suspensions, so that the present dehumidifying composition can be used in devices and instruments of various types and sizes, the desired kinetics of moisture adsorption inside a given device (instrument being attained by selecting an appropriate ratio of suspension components. As compared to the known dehumidifying agents in the form of tablets or thickened silicone oil-based mixtures, the present dehumidifying composition in the form of a film or coat occupies a very small volume inside casings and has an insignificant weight. Said beneficial characteristics of the present dehumidifying composition make it eminently suited for use in conjunction with microminiaturized electronic instruments. The dehumidifying composition contained in an instrument casing (bulb) can be repeatedly regenerated, thereby making it practicable to have a requisite stock of dehumidifier-coated casings, a further advantage of the present dehumidifier being the absence of oil on the surfaces to be welded and, hence, the ease of sealing hermetically the devices or instruments.

The present dehumidifying composition is employed without resorting to mechanical means for securing said composition in instrument (device) casings or to special-type equipment for introducing said composition into instrument (device) casings and is suitable for being introduced into casings (bulbs) of any shape or size at one and the same production section, the latter feature being highly advantageous for the simultaneous production of diverse types of semiconductor instruments. It is expedient to use the present dehumidifying composition irrespective of the scale or automation degree of production processes or when the manufacture of instrument casings and the assembly of finished semiconductor devices are carried out at different plants.

It follows from the foregoing that the present dehumidifying composition used in the form of a film or coat is commercially superior to the known dehumidifiers.

The following examples are illustrative of the manner of carrying out the invention but are not intended to limit the scope thereof.

EXAMPLE 1.

One hundred parts by weight of Type Na zeolite A (moisture content, 25 percent by weight; particle diameter, 4 mc maximum) is mixed with 100 parts by weight of epoxide resin (molecular weight, 370–450; epoxy group content, 18 percent) dissolved in 127 parts by weight of an organic solvent having the following composition, percent by weight: butyl acetate, 10; cellosolve ($C_2H_5$—$OCH_2CH_2OH$), 8; acetone, 7; butanol, 15; ethanol, 10, and toluene, 50. Dubutyl phthalate (plasticizer) is added to the stirred mixture in an amount of 5 parts by weight, followed by introducing 10 parts by weight of polyethylene polyamine (curing agent). The resulting mixture is thoroughly mixed to obtain a homogeneous suspension. The dehumidifying composition thus prepared is ready for use.

Use is made of a buret, an atomizer or a syringe to apply the composition on the inner surface of instrument metal casings (bulbs) having a volume of 0.25 $cm^3$. From 10 to 12 mg of said composition is introduced in each bulb, followed by maintaining the bulbs with said composition applied thereonto for a period of 10–20 hours in the air at ambient temperature in order to remove the bulk of volatile components. Next the bulbs are placed in a vacuum drying cabinet, subjected to gradual heating to a temperature of 180° C at a residual pressure of 0.1 mm Hg, and maintained at this temperature for a period of 3 hours. It is pertinent to gradually heat the composition in order to provide in the resultant film an access of zeolite micropores to the ambient atmosphere and to attain good adhesion of the film to the bulb surface. The resultant film displays heat stability up to a temperature of 200°C in the air. The thus-treated bulbs are ready for use as sealing components of instruments or circuits.

Mechanical tests of the film under the conditions prescribed for testing transistors enclosed in bulbs are indicative of the absence of crumbling, dusting or cracking phenomena.

The film obtained by the procedure described herein before is capable of maintaining in the hermetically sealed volume of the bulb a low relative humidity in the temperature range of from −60° to +150°C.

ing means therein delivering Fourier coefficients arranged in their inverse order.

10. A processor according to claim 7 wherein said output switch is a three-position commutator actuated by a signal from said control source and having a first position corresponding to said first input terminal, a second position corresponding to said second input terminal and a third unconnected OFF position, said second and first positions being assumed in sequence after the occurrence of detection of $n-1$ iterations, the output terminal of the commutator providing $N$ Fourier coefficients.

11. A processor according to claim 7 wherein said second switch-over means is a commutator actuated by another signal from said control source and connected to the output of a circulating sequential access memory means and to said complex multiplier, said commutator being effective to connect new samples from said memory means to the register having the higher shifting rate during one iteration and then to connect the output of said multiplier to said register having the shifting rate at other times.

* * * * *

UNITED STATES PATENT OFFICE

CERTIFICATE OF CORRECTION

Patent No. 3,704,826 Dated December 5, 1972

Inventor(s) Jean-Claude Constantin

It is certified that error appears in the above-identified patent and that said Letters Patent are hereby corrected as shown below:

In the claims:

All reference numerals and the following letters:

R, I, C, $C_1$, $C_2$, 2f, f, $A_1(k)$, A(k), $H_1$, $H_2$, $H_3$,

X + Y, X - Y, $D_1$ should have parentheses placed there around, since these are reference numerals or letters in accordance with 832 OG 5, November 1, 1966.

Signed and sealed this 29th day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.